Sept. 12, 1967   C. W. CHARLES   3,340,603
ELECTROLYTIC CAPACITOR MOUNTING APPARATUS AND METHOD
Filed Jan. 25, 1965
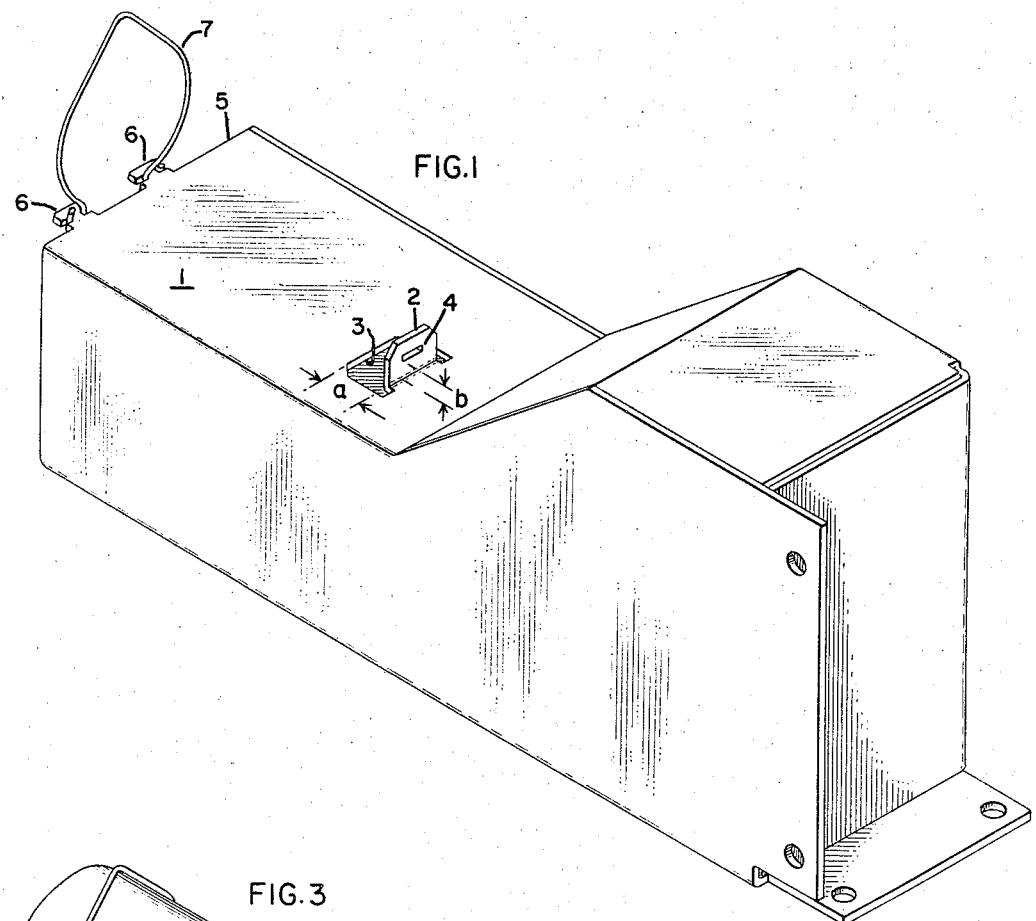
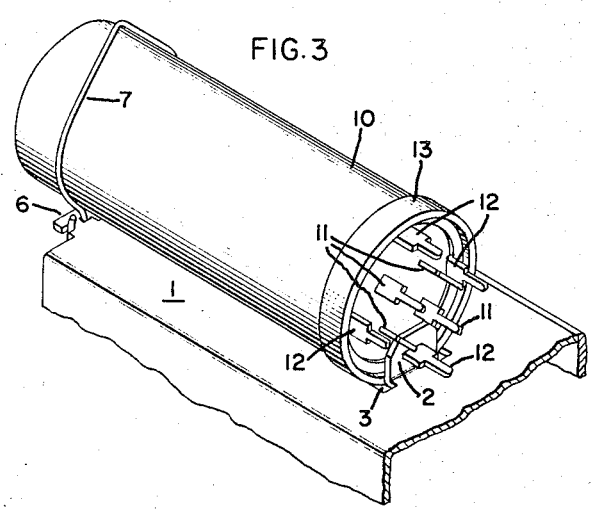
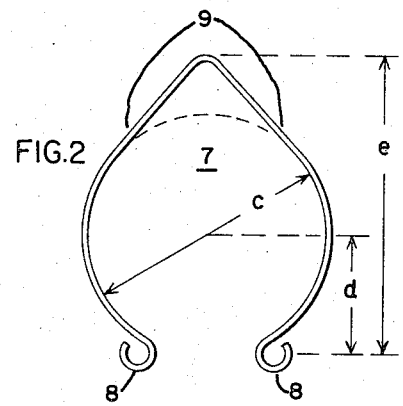
INVENTOR:
CHARLES W. CHARLES,
BY William S. Wolfe
HIS ATTORNEY.

3,340,603
ELECTROLYTIC CAPACITOR MOUNTING
APPARATUS AND METHOD
Charles W. Charles, Liverpool, N.Y., assignor to General
Electric Company, a corporation of New York
Filed Jan. 25, 1965, Ser. No. 427,681
7 Claims. (Cl. 29—592)

ABSTRACT OF THE DISCLOSURE

A capacitor with an index lug at one end is secured to a support having a tab which receives the lug and having a generally circular spring clip which engages the body of the capacitor at the other end.

---

The present invention relates to the mounting of electrical components and more specifically to an improved apparatus and method for mounting electrolytic capacitors.

Electrolytic capacitors find widespread application in mass produced electronic equipment such as television receivers. For example, electrolytic capacitors are commonly utilized to filter the B+ voltage in a television receiver. A capacitor of this type generally comprises a cylindrical metallic enclosure containing a multiple element capacitor therein. The capacitor is provided with a base defined by an increased diameter portion of the enclosure and including indexing tabs and terminals for electrical connection to the various capacitor sections.

Due to the relative bulkiness of the electrolytic capacitor and space restrictions encountered in electronic equipment such as modern television receivers, the positioning and mounting of such a capacitor poses serious design problems.

The prior art has utilized various apparatus and methods for the mounting of electrolytic capacitors. For example, spring clips of generally U-shaped cross section have been employed to grasp the capacitor, the clip being riveted to the associated member to which the capacitor is to be mounted. However, the prior art devices in general exhibited one or more shortcomings. Thus in the spring clip arrangement the dimensional tolerances of the electrolytic capacitors are such that a rigid, vibration-free mount is not always ensured for a particular size clip. Further, the assembly of the clip to the support structure requires a separate operation which is time consuming and expensive. Yet further, the prior art devices in general are not easily demountable for servicing while at the same time providing a rigid and vibration-free mount.

Accordingly, it is an object of the invention to provide an improved apparatus and method for rigid and vibration-free mounting of electrolytic capacitors.

Another object is to provide a simplified and inexpensive apparatus and method for the mounting of electrolytic capacitors.

Yet another object is to provide an improved apparatus for the mounting of electrolytic capacitors whereby the capacitor is readily demountable for servicing.

These and other objects are achieved in one embodiment of the invention through the provision of a support member having a lanced-out tab oriented generally perpendicular to the support member and a pair of mounting ears positioned at an edge of the support member. The lanced-out tab is provided with a slot for receiving an index lug at the bottom of the capacitor to be mounted. A spring wire clamp is provided for engaging the top of the capacitor, the clamp comprising a spring wire loop including means at each extremity for engaging the respective mounting ears.

The electrolytic capacitor is prepared for mounting by first making the appropriate electrical connections. The index lug is then inserted into the slot in the lanced-out tab. The top of the capacitor is then pivoted toward the support member so that the increased diameter portion of the capacitor enclosure is received with an interference fit by the aperture in the support member produced by the lancing operation. The spring clamp is then drawn downwardly over the top of the capacitor to provide rigid and vibration-free mounting.

The novel and distinctive features of the invention are set forth in the appended claims. The invention itself, together with further objects and advantages thereof may best be understood by reference to the following description and accompanying drawings in which:

FIGURE 1 is a perspective view of an electrolytic capacitor mounting apparatus in accordance with the present invention.

FIGURE 2 is an enlarged view of the spring clamp as employed in FIGURE 1, and

FIGURE 3 is a perspective view similar to FIGURE 1 showing an electrolytic capacitor mounted in accordance with the present invention.

Referring to FIGURE 1, there is shown a support member 1 for an electrolytic capacitor formed in accordance with the present invention. In a preferred embodiment of applicant's invention, the support member comprises as shown the metallic high voltage can conventionally utilized in a television receiver.

In accordance with the invention, the support member is provided with a lanced-out portion 2 positioned generally perpendicular to the support member, the lancing operation defining an aperture 3 in the support member. The lanced-out tab 2 is provided with a slot 4 for receiving the index lug of an electrolytic capacitor.

The top edge 5 of the support member 1 is provided with mounting ears 6 to which is assembled a spring wire clamp 7 for fixedly retaining the electrolytic capacitor.

The spring wire clamp 7 is depicted in detail in FIGURE 2, the clamp being generally circular in shape and having formed portions 8 at each extremity for engaging the mounting ears 6. The spring wire clamp 7 deviates from the circular configuration (as indicated by the dotted line) through the provision of an intermediate portion 9 which enables deformation of the spring wire clamp sufficient to allow the spring wire clamp to be rolled over the top of the electrolytic capacitor.

Referring now to FIGURE 3, there is shown the apparatus of the present invention with an electrolytic capacitor 10 in the mounted position. As depicted, the electrolytic capacitor 10 is provided with electrical terminals 11 and at least one index lug 12, the indexing lug 12 also being electrically connected to the ground side of the capacitor. The index lug 12 is inserted in the slot 4 to position the electrolytic capacitor. When the electrolytic capacitor is placed in a position generally flush to the support member 1 the increased diameter base portion 13 of the electrolytic capacitor is received by the aperture 3 in the support member to positively lock the capacitor in place thereby preventing motion in the axial direction. The dimensioning of the aperture 3 is such that the increased diameter base portion 13 of the electrolytic capacitor is engaged with an interference fit such that a slight force must be exerted on the electrolytic capacitor to retain the capacitor flush to the support member 1. In this manner positive axial positioning of the capacitor is achieved.

The spring wire clamp 7 is caused to engage the top of the electrolytic capacitor as depicted to maintain the capacitor generally flush to the support member to thereby ensure a rigid and vibration-free mount.

The electrolytic capacitor is mounted in accordance with the method of the present invention by initially making the desired electrical connections to the electrical terminals 11. The index lug 12 of the electrolytic capacitor 10 is then inserted in the slot 4 of the lanced-out tab 2. A slight force is exerted on the electrolytic capacitor in a direction perpendicular to the axis thereof so as to cause the increased diameter base portion 13 to be received by the aperture 3 in an interference fit. The spring wire clamp 7 is then deformed through the action of the intermediate portion 9 to allow first one side and then the other of the spring wire clamp to be rolled over the top of the electrolytic capacitor 10.

Thus, the spring wire clamp 7 provides the force sufficient to retain the electrolytic capacitor 10 in a generally flush position with the support member 1 with the increased diameter portion of the capacitor 13 locked in the aperture 3. Further mechanical rigidity can be achieved by twist locking or soldering the index tab 12 and the index tab 12 can be electrically connected to the high voltage can or a desired ground point on the chassis.

It will be appreciated that the mounting apparatus of the present invention is easily demountable to allow servicing of the electrolytic capacitor by an operation which is simply the reverse of the mounting operation.

In one particularly successful embodiment of the invention, a capacitor was employed having an approximately 1.375 inch overall diameter and including an increased diameter base portion having a diameter of approximately 1.468 inch and a width of approximately 0.25 inch, the index lug 12 being positioned on an approximately 1.06 inch diameter circle. The desired interference fit was achieved with such a capacitor through the use of an aperture as shown in FIGURE 1 having a width as defined by the dimension $a$ of approximately 0.36 inch and having the slot 4 spaced from the support member 1 by approximately 0.10 inch as defined by the dimension $b$.

Further, the spring wire clamp 7 as shown in detail in FIGURE 2 was dimensioned as follows. The generally circular portion of the spring wire clamp 7 had an inside diameter $c$ of 1.32 inch. The distance between the center of the generally circular portion and a reference plane through the center of the formed portions 8 as defined by the dimension $d$ was .66 inch whereas the height as defined by the dimension $e$ was 1.68 inch.

Although the invention has been described with respect to certain specific embodiments, it will be appreciated that modifications and changes may be made by those skilled in the art without departing from the spirit and scope of the invention. In particular, various portions of the television chassis other than the high voltage unit might advantageously be employed as a support member for the electrolytic capacitor. Further, clamps having configurations other than that disclosed might be employed.

What I claim as new and desire to secure by Letters Patent of the United States is:

1. An apparatus for mounting an electrolytic capacitor having an index lug positioned at one end thereof, said apparatus comprising:

a support member including a lanced-out tab having a lug receiving slot therein, engageable with the index lug of the capacitor, capacitor restraining means connected to said support member, and engageable with the end of the capacitor opposite the end where the lug is located to hold the capacitor against said support member.

2. An apparatus for mounting a generally cylindrical electrolytic capacitor having an index lug positioned at one end thereof, said apparatus comprising:

a support member including a lanced-out portion having a lug receiving slot therein, engageable with the index lug of the capacitor, said support member being provided with mounting ears at one edge thereof, capacitor restraining means connected to said mounting ears, and engageable with the end of the capacitor opposite the end where the lug is located to hold the capacitor against said support member.

3. An apparatus for mounting a generally cylindrical electrolytic capacitor including an increased diameter base portion and having an index lug positioned at the base portion thereof, said apparatus comprising:

a support member including a lanced-out tab and an associated aperture in said member, said tab having a lug receiving slot therein, engageable with the index lug of the capacitor, said support member being provided with mounting ears at one edge thereof, and engageable with the index lug of the capacitor, capacitor restraining means connected to said mounting ears, and engageable with the end of the capacitor opposite the end where the lug is located to hold the capacitor against said support member capable of receiving the increased diameter portion in an interfering fit.

4. The apparatus defined in claim 3 wherein said restraining means comprises a spring wire loop including means at each extremity for receiving said ear portions.

5. The apparatus defined in claim 4 wherein said spring wire loop is generally circular in shape and includes an intermediate portion which deviates from the circular shape to allow deformation of the spring wire member.

6. A method for mounting to a support member an electrolytic capacitor having electric terminals and an index lug at one end thereof, said method comprising the steps of:

(A) forming from the support member a lanced out tab having a lug receiving slot therein, (B) securing capacitor restraining means to said support member, (C) electrically connecting the terminals to desired circuit points, (D) inserting the index lug in the lug receiving slot, (E) positioning the capacitor flush to the support member, and (F) engaging the end of the capacitor opposite the lug with the capacitor restraining means.

7. A method for mounting to a support member a generally cylindrical electrolytic capacitor having an increased diameter base portion with electrical terminals and an index lug positioned at the base portion, said method comprising the steps of:

(A) forming from the support member a lanced out tab portion having an index receiving slot therein, (B) securing a spring wire clamp to one edge of said support member,
(C) electrically connecting the terminals to desired circuit points,
(D) inserting said index lug in said lug receiving slot,
(E) positioning the capacitor flush to the support member by forcing the increased diameter base portion of the capacitor into the aperture defined by the lanced-out tab portion, and
(F) engaging the end of the capacitor opposite the base portion with the spring wire clamp.

References Cited

UNITED STATES PATENTS

| 2,432,435 | 12/1947 | Millette | 248—361 |
| 2,701,866 | 2/1955 | Chapman | 248—361 |
| 2,895,118 | 7/1959 | Huetten | 248—361 |
| 3,062,261 | 11/1962 | Chesser | 29—513 |

JOHN F. CAMPBELL, *Primary Examiner.*

J. L. CLINE, *Assistant Examiner.*